United States Patent
Zha et al.

(10) Patent No.: US 10,179,872 B2
(45) Date of Patent: Jan. 15, 2019

(54) FLUID LOSS ADDITIVE FOR WATER BASED DRILLING FLUIDS WITH IMPROVED THERMAL STABILITY

(71) Applicant: HALLIBURTON ENERGY SERVICES, INC., Houston, TX (US)

(72) Inventors: Weibin Zha, The Woodlands, TX (US); Hui Zhou, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/039,352

(22) PCT Filed: Dec. 26, 2013

(86) PCT No.: PCT/US2013/077819
§ 371 (c)(1),
(2) Date: May 25, 2016

(87) PCT Pub. No.: WO2015/099735
PCT Pub. Date: Jul. 2, 2015

(65) Prior Publication Data
US 2017/0022408 A1    Jan. 26, 2017

(51) Int. Cl.
*C09K 8/035* (2006.01)
*C09K 8/508* (2006.01)
*C09K 8/516* (2006.01)
*C08F 291/00* (2006.01)

(52) U.S. Cl.
CPC ............ *C09K 8/035* (2013.01); *C08F 291/00* (2013.01); *C09K 8/508* (2013.01); *C09K 8/516* (2013.01)

(58) Field of Classification Search
None
See application file for complete search history.

(56) References Cited

U.S. PATENT DOCUMENTS

| | | | |
|---|---|---|---|
| 6,107,397 A | 8/2000 | Blankenburg et al. | |
| 6,858,301 B2 | 2/2005 | Ganapathiappan | |
| 7,449,430 B2 | 11/2008 | Guichard et al. | |
| 2006/0148928 A1* | 7/2006 | Harris | F17D 1/17 523/175 |
| 2007/0032386 A1 | 2/2007 | Abad et al. | |
| 2007/0202318 A1* | 8/2007 | Smith | B01J 13/02 428/323 |
| 2008/0011476 A1* | 1/2008 | Nguyen | C09K 8/68 166/276 |
| 2008/0064768 A1 | 3/2008 | Ziser et al. | |
| 2009/0186093 A1 | 7/2009 | Liu et al. | |
| 2012/0015852 A1 | 1/2012 | Quintero et al. | |
| 2013/0261032 A1 | 10/2013 | Ladva et al. | |

OTHER PUBLICATIONS

Young, PCT Search Report for PCT Application No. PCT/US13/77819 dated Apr. 22, 2014.
Young, PCT Written Opinion for PCT Application No. PCT/US13/77819 dated Apr. 22, 2014.
Alexandridis, Paschalis, and Bjoern Lindman. Amphiphilic block copolymers: self-assembly and applications. Elsevier, 2000.

* cited by examiner

*Primary Examiner* — John J Figueroa
(74) *Attorney, Agent, or Firm* — Locke Lord LLP

(57) ABSTRACT

A polymer microsphere for use as a fluid loss additive in drilling muds including a hydrophobic core of hydrophobic monomers and a hydrophilic shell of hydrophilic monomers wherein the hydrophilic shell surrounds the hydrophobic core. The polymer microsphere is capable of forming micelles or microgels in water without using surfactants and can be block, graft, and random copolymers. The hydrophilic shell is physically or chemically linked to the hydrophobic core. The polymer microsphere further includes crosslinkers, preferably where the crosslinkers are monomers containing at least two ethylenically unsaturated groups.

12 Claims, No Drawings

FLUID LOSS ADDITIVE FOR WATER BASED DRILLING FLUIDS WITH IMPROVED THERMAL STABILITY

FIELD OF INVENTION

The embodiments disclosed herein relate generally to methods and compositions for fluid loss additives for polar solvent drilling fluids with improved thermal stability for use as fluid loss additives in oilfield applications.

BACKGROUND OF INVENTION

Polar solvent-based drilling fluids include water, ethylene glycol, propylene glycol, glycerol, N-methylpyrrolidone, and other solvents that are water soluble or miscible. Drilling muds can contain an oil soluble polymer in the form of a gel as fluid loss reducer. A process for preparing an oil soluble polymer fluid loss control agent may include the steps of dissolving at least one polymer in a hydrocarbon oil to form a clear solution or a gel, adding an emulsifier to the solution or the gel, and keeping the mixture under conditions of agitation until a clear creamy mixture is obtained. Because of high temperature stability of the polymer used, this fluid loss agent can be used at high temperature and high pressure in water-based muds.

The use of oil soluble polymers with surfactants is distinct from using polymers made with hydrophobic and hydrophilic monomers. Usually oil soluble polymers/hydrophobic polymers have higher temperature stability than water soluble polymers/hydrophilic polymers. However, the present invention offers thermal stability of hydrophobic polymers while using hydrophilic polymers to help disperse the hydrophobic polymer in water instead of using surfactant.

DETAILED DESCRIPTION OF DISCLOSED EMBODIMENTS

As an initial matter, it will be appreciated that the development of an actual, real commercial application incorporating aspects of the disclosed embodiments will require many implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time.

While a developer's efforts might be complex and time-consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

In a selection of preferred embodiments, this disclosure describes the composition and preparation of self-dispersible polymer microspheres for use as fluid loss additives in oilfield applications.

This invention discloses embodiments including using block copolymers (such as polystyrene-b-polyethylene oxide), grafted copolymers or randomly copolymerized polymers with one water soluble monomer (such as N-vinylpyrrolidone) and one hydrophobic monomer (such as vinyl acetate) as fluid loss control additives for water-based drilling fluid systems. With one block (polyethylene oxide) soluble in water, the block copolymer can form micelles or microgels in water without using surfactant.

These soft microgels will lower the permeability of filter cake so as to control the fluid loss. By controlling synthesis method, the microgels can also be made by random copolymerization or graft polymerization with water soluble monomer rich on the surface so that the microgels can be stabilized in water.

For example, the block copolymer may be the hydrophobic monomer with low Tg (low transformation temperature) to maintain the flexibility of the microgels. The majority of hydrophobic monomers in random copolymers have very limited direct contact with water so they are hydrolytically stable.

One embodiment of the present invention includes using block, grafted copolymer or random copolymers of hydrophilic and hydrophobic monomers as fluid loss control agent. Because these polymers can form microgels in water without an emulsifier, the procedure to use these polymers will be much easier than current practices. These polymers may have high temperature stability so that they can be expected to be useful for drilling wells where the downhole temperature is higher than about 350° F.

Self-dispersible polymer microspheres are polymeric particles with a hydrophobic core surrounded by a layer of hydrophilic polymers. When added into water, these polymer microspheres are readily dispersed in the aqueous phase without the addition of emulsifiers.

The particle size of the polymer microspheres preferably ranges from about 0.01 to about 1000 microns. In a preferred embodiment to be used as an effective fluid loss control additive, the particle size is preferably between about 0.1 and about 100 microns.

The polymer microspheres can be block, graft, and random copolymers of hydrophobic and hydrophilic monomers, or can be a core-shell structure in which the hydrophobic core is surrounded by a hydrophilic shell. In the case of core-shell structure, the core and shell can be physically or chemically linked. The hydrophobic monomers generally refer to those with water solubility of less than about 100 g/L, whereas the hydrophilic monomers have water solubility higher than about 100 g/L at room temperature.

Examples of hydrophobic monomers include styrene, substituted styrene, alkyl acrylate, alkyl methacrylate, acrylonitrile, methacrylonitrile, N-alkyl acrylamide, N-alkyl methacrylamide, vinyl acetate, vinyl esters, N-vinylamides, isoprene, butadiene, diesters of maleic, fumaric, or itaconic acid.

Examples of hydrophilic monomers include anionic, cationic, nonionic, and amphoteric monomers.

Suitable anionic monomers include acrylic acid, methacrylic acid, maleic acid, fumaric acid, itaconic acid, monoesters of maleic, fumaric, or itaconic acid, sodium vinylsulfonate, sodium allyl or methallyl sulfonate, sodium styrenesulfonate, 2-acrylamido-2-methylpropanesulfonic acid (AMPS), sodium 3-allyloxy-2-hydroxypropane-1-sulfonate (AHPS), and vinylphosphonic acid. Although the acids can be polymerized directly, they are generally neutralized with base from alkali metal hydroxide, alkaline earth metal hydroxide, ammonia, and amines before polymerization.

Suitable cationic monomers generally contain an amine or ammonium group. Examples of cationic monomers include 2-, 3- or 4-vinylpyridine, N-vinylimidazole, 2-methyl-1-vinylimidazole, N-(3-(dimethylamino)propyl) methacrylamide, 2-(diethylamino)ethyl methacrylate, (3-acrylamidopropyl)trimethylammonium chloride, diallyldimethylammonium chloride. The amine groups in the cationic monomers can be converted into quaternary ammonium by alkylating agents such as alkyl or aryl halides.

Examples of nonionic monomers include acrylamide, methacrylamide, N-alkyl acrylamides or methacrylamides in which the alkyl group contains 1-3 carbons, N-[tris(hydroxymethyl)methyl]acrylamide, N-vinylpyrrolidone, N-vinylcaprolactam, monovinyl or monoallyl ethers of polyols (such as ethylene glycol monovinyl ether, ethylene glycol monoallyl ether, and glycerol monoallyl ether), mono-acrylates or methacrylates of poyols (such as 2-hydroxyethyl acrylate and poly(ethylene glycol) monomethacrylate), and N-vinylamides (such as N-vinylformamide and N-vinylacetamide). Note that the acrylate- and acrylamide-based monomers can be converted to anionic monomers after hydrolysis in water.

Amphoteric monomers are monomers that contain both anionic and cationic groups. Examples of amphoteric monomers include betaine, sulfobetaine (or sultaine), and phosphobetaine-type monomers.

The amount of hydrophobic units in the polymer microspheres can be about 5% to about 95% by weight, preferably about 10% to about 90% by weight, and most preferably about 20% to about 80% by weight.

The polymer microspheres can be crosslinked by the addition of crosslinkers during polymerization. Crosslinkers are monomers containing at least two ethylenically unsaturated groups. Examples of crosslinkers include methylenebisacrylamide, divinyl benzene, vinyl or allyl ethers of polyglycols or polyols, acrylate or methacrylate esters of polyglycols or polyols, divinylbenzene, vinyl or allyl acrylates and methacrylates, divinylimidazolidone, and dienes.

The amount of crosslinker can be about 0.01% to about 10% by weight, preferably about 0.05% to about 8% by weight, and most preferably about 0.1% to about 6% by weight.

The polymers can be prepared by solution, suspension, precipitation, dispersion, or emulsion polymerization. Emulsion polymerization is the most common way of preparing polymer microspheres. Surfactant free emulsion polymerization is preferred.

In surfactant-free polymerization, the monomers are polymerized in the presence of ionic or ionizable monomers. Some of the monomers stabilize the polymers, thus obviating the need to use emulsifiers and/or protective colloids in the course of the emulsion polymerization. Surface-active compounds can be added to the polymerization reaction.

Conventional emulsion polymerization is also applicable. In the conventional emulsion polymerization, emulsifiers or surfactants are used to disperse hydrophobic monomers into aqueous phase.

In a preferred embodiment to make the core-shell structure, the hydrophobic core can be synthesized first by emulsion polymerization. The surface of the core then can be modified or activated by physical (gamma rays) or chemical reactions so that a hydrophilic monomer can be further grafted on the hydrophobic core. The shell should be thick enough that the microspheres can be dispersed in water without agglomerate. To ensure the hydrophilic shell is thick enough, the weight of hydrophilic shell can be about 5% to about 95% by weight, preferably about 10% to about 90% by weight and most preferably about 20% to about 80% by weight.

A polymer microsphere for use as a fluid loss additive including a hydrophobic core of hydrophobic monomers and a hydrophilic shell of hydrophilic monomers wherein the hydrophilic shell surrounds the hydrophobic core. The polymer microsphere preferably has a particle size of between about 0.01 to about 1000 microns and more preferably between about 0.1 and about 100 microns. The polymer microsphere is capable of forming micelles or microgels in water without using surfactants and can be block, graft, and random copolymers. The hydrophilic shell is physically or chemically linked to the hydrophobic core. The hydrophobic monomers are selected from a group consisting of styrene, substituted styrene, alkyl acrylate, alkyl methacrylate, acrylonitrile, methacrylonitrile, N-alkyl acrylamide, N-alkyl methacrylamide, vinyl acetate, vinyl esters, N-vinylamides, isoprene, butadiene, diesters of maleic, fumaric, and itaconic acid. The hydrophilic monomers are selected from a group consisting of anionic, cationic, nonionic, and amphoteric monomers. The hydrophobic monomers in the polymer microsphere are about 5% to about 95% by weight of the polymer microsphere. The polymer microsphere further includes crosslinkers, preferably where the crosslinkers are monomers containing at least two ethylenically unsaturated groups, and wherein the amount of crosslinker is between about 0.01% to about 10% by weight of the polymer microsphere.

The preferred embodiment includes a method of preparing self-dispersible polymer microspheres for use as fluid loss additives, which includes the steps of forming a hydrophobic core of hydrophobic monomers and grafting hydrophilic monomers on the hydrophobic core to form a hydrophilic shell on the hydrophobic core. The method preferably uses emulsion polymerization free of surfactants. In a preferred embodiment, hydrophilic shell has a weight of between about 10% to about 70% by weight, of the polymer microsphere and/or each polymer microsphere has a particle size of between about 0.01 to about 1000 microns. In a most preferred embodiment, the polymer microsphere is capable of forming micelles or microgels in water without using surfactants.

The preferred method of use the invention is using a plurality of self-dispersible polymer microspheres as fluid loss additives, which include introducing the self-dispersible polymer microspheres into a drilling mud; where each self-dispersible polymer microsphere includes a hydrophobic core of hydrophobic monomers and a hydrophilic shell of hydrophilic monomers wherein the hydrophilic shell surrounds the hydrophobic core. The self-dispersible polymer microspheres are free of surfactants. The hydrophilic shell preferably has a weight of between about 10% to about 70% by weight of the self-dispersible polymer microspheres. Each self-dispersible polymer microsphere preferably has a particle size of between about 0.01 to about 1000 microns. Each self-dispersible polymer microsphere preferably is selected from the group consisting of block, graft, and random copolymers. The hydrophilic shell is preferably physically or chemically linked to the hydrophobic core of each self-dispersible polymer microsphere.

Therefore, the present embodiments are well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein.

Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention.

The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps.

All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values.

Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

While the disclosed embodiments have been described with reference to one or more particular implementations, those skilled in the art will recognize that many changes may be made thereto without departing from the spirit and scope of the description. Accordingly, each of these embodiments and obvious variations thereof is contemplated as falling within the spirit and scope of the claimed invention, which is set forth in the following claims.

What is claimed is:

1. A polymer microsphere for use as a fluid loss additive comprising:
   a hydrophobic core of hydrophobic monomers; and
   a hydrophilic shell of hydrophilic monomers;
   wherein the hydrophilic shell surrounds the hydrophobic core; and
   wherein the polymer microsphere disperses in water without the need for an emulsifier.

2. The polymer microsphere of claim 1 wherein each polymer microsphere has a particle size of between about 0.01 to about 1000 microns.

3. The polymer microsphere of claim 1 wherein each polymer microsphere has a particle size of between about 0.1 and about 100 microns.

4. The polymer microsphere of claim 1 wherein the polymer microsphere is capable of forming micelles or microgels in water without using surfactants.

5. The polymer microsphere of claim 1 wherein each polymer microsphere is selected from the group consisting of block, graft, and random copolymers.

6. The polymer microsphere of claim 1 wherein the hydrophilic shell is physically or chemically linked to the hydrophobic core.

7. The polymer microsphere of claim 1 wherein the hydrophobic monomers are selected from a group consisting of styrene, substituted styrene, alkyl acrylate, alkyl methacrylate, acrylonitrile, methacrylonitrile, N-alkyl acrylamide, N-alkyl methacrylamide, vinyl acetate, vinyl esters, N-vinylamides, isoprene, butadiene, diesters of maleic, fumaric, and itaconic acid.

8. The polymer microsphere of claim 1 wherein the hydrophilic monomers are selected from a group consisting of anionic, cationic, nonionic, and amphoteric monomers.

9. The polymer microsphere of claim 1 wherein the hydrophobic monomers in the polymer microsphere are about 5% to about 95% by weight of the polymer microsphere.

10. The polymer microsphere of claim 1 wherein the polymer microsphere further comprise a plurality of crosslinkers.

11. The polymer microsphere of claim 10 wherein the crosslinkers are monomers containing at least two ethylenically unsaturated groups.

12. The polymer microsphere of claim 11 wherein the amount of the crosslinkers is between about 0.01% to about 10% by weight of the polymer microsphere.

* * * * *